(12) United States Patent
Shichijoh et al.

(10) Patent No.: US 7,800,273 B2
(45) Date of Patent: Sep. 21, 2010

(54) AC ELECTRIC ROTATING MACHINE WITH MULTIPHASE STATOR COILS

(75) Inventors: Akiya Shichijoh, Yatomi (JP); Shin Kusase, Oobu (JP); Takeshi Araki, Oobu (JP)

(73) Assignee: Denso Corporation, Kariya (JP)

( * ) Notice: Subject to any disclaimer, the term of this patent is extended or adjusted under 35 U.S.C. 154(b) by 312 days.

(21) Appl. No.: 11/905,586

(22) Filed: Oct. 2, 2007

(65) Prior Publication Data
US 2008/0079328 A1  Apr. 3, 2008

(30) Foreign Application Priority Data
Oct. 3, 2006 (JP) ............................. 2006-272005
Feb. 9, 2007 (JP) ............................. 2007-030859

(51) Int. Cl.
*H02K 11/00* (2006.01)
(52) U.S. Cl. ......................................... 310/208; 310/71
(58) Field of Classification Search ................. 10/71, 10/201, 208; 310/71, 201, 208
See application file for complete search history.

(56) References Cited

U.S. PATENT DOCUMENTS

| | | | |
|---|---|---|---|
| 6,268,678 B1 | 7/2001 | Asao et al. | |
| 6,366,000 B1 | 4/2002 | Higashino et al. | |
| 6,373,163 B1 | 4/2002 | Oohashi et al. | |
| 6,396,185 B1 | 5/2002 | Asao et al. | |
| 6,455,972 B1 | 9/2002 | Asao et al. | |
| 6,459,187 B1 | 10/2002 | Oohashi et al. | |
| 6,469,413 B1 * | 10/2002 | Oohashi et al. | 310/184 |
| 6,501,204 B1 | 12/2002 | Oohashi et al. | |
| 6,501,205 B1 | 12/2002 | Asao et al. | |
| 6,504,283 B1 | 1/2003 | Asao et al. | |
| 6,794,785 B2 | 9/2004 | Isogai et al. | |
| 6,894,414 B1 | 5/2005 | Asao et al. | |
| 6,930,426 B2 | 8/2005 | Neet et al. | |
| 7,164,217 B2 * | 1/2007 | Kabasawa et al. | 310/71 |

FOREIGN PATENT DOCUMENTS

| | | |
|---|---|---|
| JP | B2 3476416 | 9/2003 |
| JP | A 2004-088993 | 3/2004 |

* cited by examiner

*Primary Examiner*—Dang D Le
(74) *Attorney, Agent, or Firm*—Oliff & Berridge, PLC

(57) ABSTRACT

A stator coil includes a belt-shaped winding band and a same-layer bridging portion. The winding band makes one or more rounds, while turning back in the axial direction a plurality of conductor wires which are aligned in parallel at a pitch of electric angle π (pi). The same-layer bridging portion connects a pair of the conductor wires which are of the same phase at the end portion of the winding and which are arranged in the same layer of the slot. Such arrangement enables forming a compact multi-phase stator coil.

11 Claims, 8 Drawing Sheets

AFTER COIL INSERTION 201  203  202  203

AFTER DEFORMATION OF TEETH DISTAL END

AC ELECTRIC ROTATING MACHINE WITH MULTIPHASE STATOR COILS

CROSS-REFERENCE TO RELATED APPLICATIONS

This application is based on and claims the benefit of priority from earlier Japanese Patent Applications No. 2006-272005 filed on Oct. 3, 2006 and No. 2007-30859 filed on Feb. 9, 2007, the description of which is incorporated herein by reference.

BACKGROUND OF THE INVENTION

1. Technical Field of the Invention

The present invention relates to improvement of an AC electric rotating machine with a stator in which multiphase stator coils are wound.

2. Description of the Related Art

One example of an AC (alternating current) electric rotating machine is proposed in Japanese Patent Publication (laid open) No. 2004-88993. For the AC electric rotating machine disclosed in this patent publication, a stator coil as described below is shown. In this example, the stator coil has a structure which is formed by a sequential process as follows. The process uses a U-shaped conductor (hereafter also referred to as a long U-shaped segment) which has a pair of long leg portions which extend in parallel with and separated from each other by a distance equivalent to the electric angle $\pi$ (pi: a single magnetic pole pitch). The processing includes displacing the U-shaped conductor in a direction (i.e., the circumferential direction or the tangential direction when the stator core is installed) which is perpendicular to the direction in which the leg portions extend (i.e., the axial direction when the stator core is installed) by one magnetic pole pitch at a predetermined position from the side of a U-shaped head portion, and subsequently turning back the U-shaped conductor in the direction in which the leg portions extend. In this structure, a developed coil is configured having a shape in which a wave winding (also referred to as wave phase winding) equivalent to one phase has been developed. The developed coil is rounded into a cylindrical shape whereby the wave phase winding is formed. Next, the wave phase windings with the necessary number of phases are arranged in a state in which the wave phase windings are displaced from each other in the circumferential direction by a predetermined pitch which is equivalent to the inter-phase electric angle, whereby a cylindrical multi-phase stator coil is formed. Next, the multi-phase stator coil is pressed to the inside of each slot through an opening of each slot (also referred to as a slot opening) which is opened inwards in the radial direction of the stator core. The stator coil manufactured with the art will be hereafter referred to as a turning-back stator coil. Note that the turning-back as described above does not mean that the coil is not turned back as if it is folded up or down, but it means that the coil is turned back as if the coil wraps around a plate.

The stator coil will now be further described. One turn of the stator coil includes a pair of slot conductor portions and a pair of bridging portions. The pair of slot conductor portions are housed in a predetermined conductor housing position in the radial direction (also referred to as "layer" in the present specification) in the slot, and are separated from each other by substantially one magnetic pole pitch. The pair of bridging portions connect the pair of slot conductor portions which are separated from each other by substantially one magnetic pole pitch outside the slot. The turning-back stator coil has a single same-layer bridging portion and bridging portions (also referred to as different-layer bridging portions). The same-layer bridging portion connects in series the slot conductor portions which are at the same position in the radial direction (referred to as same layer) of two slots which are separated from each other corresponding to the magnetic pole pitch of NS poles of a rotor. Each bridging portion connects in series the slot conductor portions which are at different positions in the radial direction (referred to as different layers) of two slots which are separated from each other corresponding to the magnetic pole pitch of NS poles of a rotor. Each bridging portion forms a coil end on either opposite end in the axial direction of a stator core.

Further, a stator coil which is similar to the above-mentioned turning-back stator coil in the foregoing Japanese Patent Publication (laid open) No. 2004-88993 is disclosed in U.S. Pat. No. 6,930,426 and Japanese Patent No. 3476416.

However, Japanese Patent No. 3476416 describes a drawback in that both end portions must be connected to each other after the developed coil is wound around the stator in the layered state.

In addition, U.S. Pat. No. 6,930,426 describes a drawback in that the size of the coil end is increased since the coil is wound by merely meandering winding. Furthermore, Japanese Patent Publication (laid open) No. 2004-88993 describes a drawback in that the size of the connecting portion is increased. Furthermore, at least one of the same-layer bridging portion is provided for each phase and extends in the circumferential direction for connecting a pair of in-slot conductors in the same layer, which may cause spatial interference with other bridging portions which are adjacent thereto. Accordingly, the same-layer bridging portion and the other bridging portion which is adjacent thereto are bent inwards in the radial direction by a large amount to avoid the above-mentioned spatial interference. However, bending of the bridging portion inwards in the radial direction by a large amount creates a new problem with spatial interference between the bridging portion and an outer peripheral surface of the rotor. As a result of this, problems such as difficult designing and complicated operation in inserting the rotor in the stator are also created.

SUMMARY OF THE INVENTION

The present invention has been accomplished in view of the above-mentioned problems. It is an object of the present invention to provide an AC electric rotating machine which has a compact and easy-to-manufacture stator coil while avoiding spatial interference of a same-layer bridging portion.

The above-mentioned problems are solved in the present invention where a rotating machine which has a multi-phase stator coil housed in many slots of a cylindrical stator core. In the electric rotating machine, the stator coil includes: a belt-shaped winding band, the winding band includes a plurality of conductor wires which are sequentially housed in the slots which are separated from each other by electric angle substantial $\pi$ (pi) and which are aligned in parallel, and the winding band going around the stator core for two or more times while turning back in the axial direction at a pitch of electric angle substantial $\pi$, and a same-layer bridging portion, the same-layer bridging portion including a plurality of bridging conductor portions which are provided on an outer side of one end face of the stator core for connecting end portions of the same phase which are separated from each other by an electric angle $\pi$ of end portions of each conductor wire, and the same-layer bridging portion being formed separately from the conductor wire of the winding band and joined to the end portion of the winding band or includes a part of the conductor wire of the winding band. The bridging conductor portion of the same-layer bridging portion connects the end portions of the same phase of each conductor wire which is protruded from the same layer of each slot. The conductor wire includes: many slot conductor portions which are sequentially housed in two different layers of the slots of the same phase which are separated from each other by electric angle $\pi$; and a different-layer bridging portion which communicates the end portions of a pair of the slot conductor portions which are housed in two different layers of the slots of the same phase which are separated from each other by electric angle $\pi$ on the outer side in the axial direction of the stator core to form a coil end portion.

As is well known, the slot for an inner rotor type is opened to the inner peripheral surface of the cylindrical stator core, and the slot for an outer rotor type is opened to the outer peripheral surface thereof. The present invention will be hereafter described using the inner rotor type as an example.

Specifically, in the electric rotating machine according to the present invention, the stator coil is configured using the end portions of the belt-shaped winding band and the same-layer bridging portion. The belt-shaped winding band is formed into a ring shape by advancing the conductor wires which are aligned in parallel in one of the circumferential directions, while turning back the conductor wires by electric angle $\pi$.

The same-layer bridging portion includes a plurality of the bridging conductor portions which are aligned in parallel. Preferably, the number of the bridging conductor portions is the half of the number of the conductor wires forming the winding band.

The bridging conductor portion connects the end portions of the pair of conductor wires of the same phase which are separated by electric angle $\pi$ of the end portions of the individual conductor wires forming the end portions of the winding band. Accordingly, it is preferable that the conductor wires and the bridging conductor portions are arranged in the range of electric angle $2\pi$.

The winding band includes a plurality of conductor wires which are aligned in parallel. Each conductor wire is formed by alternately connecting the slot conductor portion in the slot and the different-layer bridging portion. The different-layer bridging portion communicates between the slot conductor portions to form the coil end. A pair of slot conductor portions which communicate both ends of a single different-layer bridging portion are separated from each other by electric angle substantial $\pi$, and are individually housed in two different layers (preferably, in two layers which are adjacent to each other in the radial direction) within the slot. The winding band formed of a plurality of conductor wires may advance in parallel to each other in the winding state or in the overlap winding state.

Such an arrangement enables forming a winding stator coil which has a simplified shape. Furthermore, the same-layer bridging portion bridges in the circumferential direction at a position which is different from the position of the different-layer bridging portion which forms the coil end. This enables avoiding spatial interference between the same-layer bridging portion and the different-layer bridging portion. In addition, this also enables aligning the different-layer bridging portions of the winding band formed of conductor wires with a large sectional area, thereby enabling size reduction of the coil end.

Note that two conductor wires form the slot conductor portion and the different-layer bridging portion, and form a part of the winding band. The bridging conductor portion communicates them to function as a single same-layer bridging portion. The two conductor wires and the bridging conductor portion may be formed by bending a single conductor wire at the center portion thereof.

In a preferred aspect, the bridging conductor portion of the same-layer bridging portion is formed separately from the conductor wire of the winding band and joined to the end portion of the winding band. Such an arrangement enables the same-layer bridging portion to be formed for requiring complicated shape processing separately from the winding band, thereby making the manufacturing operation easier.

In a preferred aspect, the end portion of the winding band is protruded from each conductor wire housed either in an innermost layer which is on the innermost side in the radial direction or in an outermost layer which is on the outermost side in the radial direction of many layers of the slot. Such an arrangement makes the connection between each bridging conductor portion which forms the same-layer bridging portion and the end portion of the winding band easier.

In a preferred aspect, each bridging conductor portion of the same-layer bridging portion is arranged at a position which is overlapped in the axial direction with a protruded conductor portion which is formed of the end portion of the conductor wire which is protruded outwards in the axial direction of the different-layer bridging portion which forms the coil end portion of each conductor wire, and extends at least in the circumferential direction. Because of this, arrangement of the same-layer bridging portion the length in the axial direction of the stator coil is prevented from increasing.

In a preferred aspect, the bridging conductor portion has a substantially U-letter shape which includes a center portion extending in the substantially circumferential direction and which includes a pair of end portions communicating with both ends respectively of the center portion and extending at least in the axial direction. The pair of end portions extend toward positions which are adjacent to distal-ends of the end portions of the conductor wires and are coupled to the distal-ends of the end portions of the conductor wires. Such an arrangement enables compact arrangement of each bridging conductor portion which forms the same-layer bridging portion.

In a preferred aspect, the center portions of the bridging conductor portions of mutually different phases are arranged at different positions in the axial direction and at the same position in the radial direction. Such an arrangement enables compact arrangement of each bridging conductor portion which forms the same-layer bridging portion.

In a preferred aspect, the bridging conductor portion has a substantially V-letter shape which includes a one half portion extending in one of the circumferential directions and inwards in the axial direction, and an other half portion extending in one of the circumferential directions and outwards in the axial direction from the end portion of the one half portion. In addition, the one half portion and the other half portion of the bridging conductor portion extend separately from each other in the radial direction by an amount equal to thickness or more in the radial direction of the bridging conductor portion. Such arrangement enables compact arrangement of each bridging conductor portion which forms the same-layer bridging portion.

In a preferred aspect, the one half portion of each bridging conductor portion of mutually different phases are arranged at the same position in the radial direction except the end portions. In addition the other half portion of each bridging conductor portion of mutually different phases are arranged at the same position in the radial direction except the end portions. In addition, the one half portion and the other half portion are arranged adjacent to each other in the radial direction. Such an arrangement enables each bridging conductor portion which configures the same-layer bridging portion.

In a preferred aspect, each bridging conductor portion has a substantially V-letter shape which includes a one half portion extending in one of the circumferential directions and inwards in the radial direction, and an other half portion extending in one of the circumferential directions and outwards in the radial direction from the end portion of the one half portion. In addition, the one half portion and the other half portion of the bridging conductor portion extend separately from each other in the axial direction by an amount is equal to or greater in distance or thickness in the axial direction of the bridging conductor portion. Such an arrangement enables compact arrangement of each bridging conductor portion which forms the same-layer bridging portion.

In a preferred aspect, the one half portion of each bridging conductor portion of mutually different phases are arranged at the same position in the axial direction except the end portions. In addition, the other half portion of each bridging conductor portion of mutually different phases are arranged at the same position in the axial direction except the end portions. In addition, the one half portion and the other half portion are arranged adjacent to each other in the axial direction. Such an arrangement enables compact arrangement of each bridging conductor portion which forms the same-layer bridging portion.

In a preferred aspect, the same-layer bridging portion is arranged at a position which is overlapped in the radial direction with the different-layer bridging portion which forms the coil end portion of the winding band. Such an arrangement enables compact arrangement of each bridging conductor portion which forms the same-layer bridging portion, thereby enabling further size reduction of the electric rotating machine.

Note that, in the present aspect, when the same-layer bridging portion is to be arranged to the side of a back yoke of the stator core, if the necessary length in the radial direction of the same-layer bridging portion is larger than that of the back yoke, only a portion which is adjacent to the same-layer bridging portion of the cylindrical housing may be provided in a protruding state in the radial direction. In addition, heat radiation performance of the stator coil can be enhanced by adhesion between the same-layer bridging portion and the inner peripheral surface of the housing via a thermally conductive insulating film.

In a preferred aspect, the winding band has a peripheral end different-layer bridging portion which is a different-layer bridging portion for communicating the slot conductor portion forming a tall end of the Nth (wherein N is an integer 1 or more) orbit and the slot conductor portion forming a start end of the (N+1)th orbit, and goes around two or more times. In addition, the peripheral end different-layer bridging portion has a shape which is different from the other different-layer bridging portions when viewed in the axial direction, and is arranged at a position where the other different-layer bridging portions are not arranged. This enables compact housing of the coil end (different-layer bridging portion) at a boundary portion between the Nth orbit and the (N+1)th orbit of the winding band.

In a preferred aspect, the other different-layer bridging portion on the Nth orbit communicates the slot conductor portion housed in the Mth layer on one end side in the circumferential direction and the slot conductor portion housed in the (M+1)th layer on the other end side in the circumferential direction. In addition, the other different-layer bridging portion on the (N+1)th orbit communicates the slot conductor portion housed in the (M+2)th layer on one end side in the circumferential direction and the slot conductor portion housed in the (M+3)th layer on the other end side in the circumferential direction. In addition, the peripheral end different-layer bridging portion communicates the slot conductor portion housed in the (M+2)th layer on one end side in the circumferential direction and the slot conductor portion housed in the (M+1)th layer on the other end side in the circumferential direction. Such arrangement enables compact housing of the coil end (different-layer bridging portion) at the boundary portion between the Nth orbit and the (N+1)th orbit of the winding band.

In a preferred aspect, the conductor wires and the bridging conductor portions are formed of rectangular wires. Such arrangement enables enhancing the slot space factor.

The stator coil according to the present invention houses the winding band or the winding band & same-layer bridging portion having a substantially or completely finished shape in each slot. Therefore, each slot has a shape and structure which allows substantially completely formed stator coil of this type to be pressed thereinto. For example, a slot opening can be throttled by plastically deforming each teeth distal-end portion on both sides of an open slot having a wide slot opening.

DESCRIPTION OF THE PREFERRED EMBODIMENTS

Preferable embodiments of an AC generator for a vehicle employing a stator coil according to the present invention will now be described with reference to drawings. However, the stator coil according to the present invention is not limited to the embodiments as described below, and may be widely employed for stator coils of an AC electric rotating machine.

First Embodiment

The entire structure will now be described.

Figure 1:
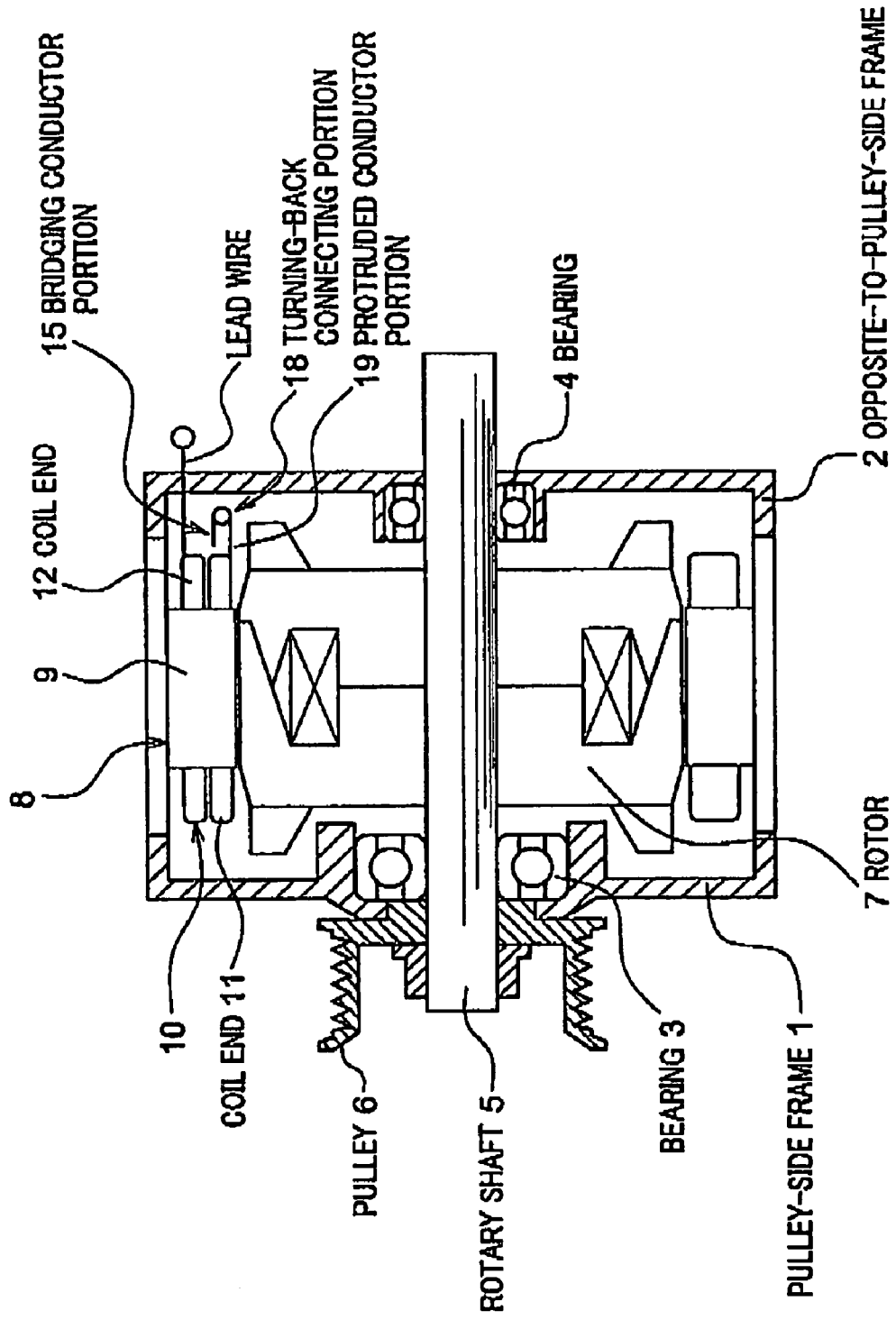
FIG. 1 is a schematic axial sectional view of an AC generator for a vehicle in which a turning-back stator coil according to a first embodiment of the present invention is employed.

FIG. 1 is a vertical sectional view showing an AC generator for a vehicle in which a stator coil according to a first embodiment of the present invention is wound. The AC generator for a vehicle includes a pulley-side frame 1 and an opposite-to-pulley-side frame 2, bearings 3, 4, a rotary shaft 5, a pulley 6, a Lundell rotor (rotor) 7 and a stator 8. The pulley-side frame 1 and the opposite-to-pulley-side frame 2 are bowl-shaped end frames. The rotary shaft 5 rotatably supported by the pulley-side frame 1 and the opposite-to-pulley-side frame 2 via the bearings 3, 4. The pulley 6 is secured to a distal-end portion of the rotary shaft 5 which is protruded from the pulley-side frame 1. The Lundell rotor 7 is secured to the rotary shaft 5. The stator 8 is sandwiched between the pulley-side frame 1 and the opposite-to-pulley-side frame 2 at a position surrounding the rotor 7.

The stator 8 includes a cylindrical stator core 9 and a stator coil 10 which is wound around the stator core 9, as will be hereinafter described. The stator coil 10 has a first coil end 11 which is protruded from the stator core 9 to the pulley 6 side, and a second coil end 12 which is protruded from the stator core 9 to the opposite-to-pulley side.

Since an AC generator for a vehicle having the Lundell rotor 7 of this type is widely known to those skilled in the art, further description on the structure and the operation therefor will be omitted.

The stator 8 will be described in more detail with reference to FIG. 2.

The stator core 9 has two slots in each pole and phase, and the stator coil 10 includes two sets of three-phase winding coils. The stator coil 10 is configured by a phase winding having a plurality of phases. The number of phases thereof equals to the number of phases of the stator coil 10.

Figure 2:
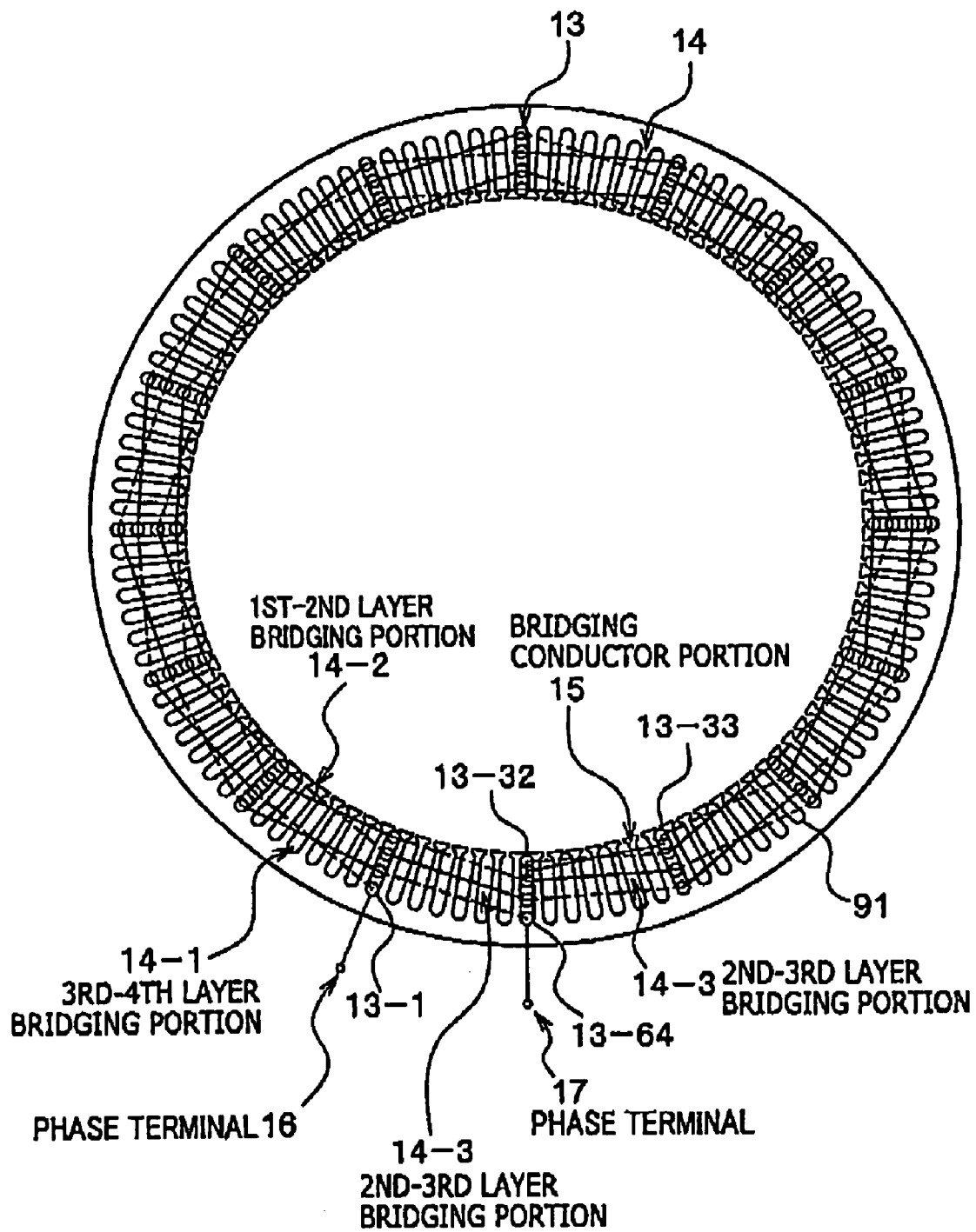
FIG. 2 is a side view showing a wiring state of a coil end of the stator coil in FIG. 1.

FIG. 2 is a side view of the stator 8 for showing a spatial configuration of a single phase winding of the stator coil 10. The single phase winding is configured by series connection of via a bridging conductor portion which forms a same-layer bridging portion. The two partial coils are sequentially wound (or overlap wound) around two slots of the same phase which are separated from each other by electric angle π (pi).

In the present embodiment, the stator core 9 has two slots 91 in each pole and phase, and the number of magnetic poles of the rotor 7 is set as 16. Accordingly, the total number of the slots 91 is 96. Each phase winding is configured by a copper wire (continuous conductor wire) with a rectangular section which is coated with an insulating film and which is normally referred to as a rectangular wire. After extending from the slot 91, the phase winding turns back and returns to the next slot 91 which is separated by electric angle π. The methods of forming and arranging the phase winding itself may be substantially the same as the method described in the foregoing Japanese Patent Publication (laid open) No. 2004-88993.

The single phase winding of the stator coil 10 will be further described in more detail with reference to FIG. 2.

The phase winding is housed in the slots 91 of the stator core 9 via an insulator. FIG. 2 illustrates only one phase winding. Each phase winding has a winding band and a same-layer bridging portion 15. The winding band includes slot conductor portions 13 and bridging conductor portions (which are referred to as different-layer bridging portion in the present inventions) 14. Each slot conductor portion 13 is housed separately in four conductor housing positions (which are also referred to as layers) which are sequentially arranged in the radial direction in the slot 91. Each bridging conductor portion 14 communicates end portions on the same side in the axial direction of a pair of the slot conductor portions 13 which are respectively housed in the two slots 91, 91 which are separated from each other by a one-magnetic pole pitch (6-slot pitch). The same-layer bridging portion 15 includes the bridging conductor portions. Each bridging conductor portion connects a pair of the end portions of the same phase of the end portions of the conductor wires which form the end portions of the winding band. Therefore, the same-layer bridging portion 15 is configured by six bridging conductor portions, which is the half of 12 conductor wires which are aligned in parallel with each other to form the winding band.

The phase winding has also a pair of phase terminals 16, 17 which include both end portions of the winding band on one-end side of two continuous lines (continuous wires) which are separated from each other by electric angle π. Note that both end portions of the winding band on the other-end side of the two continuous lines which are separated from each other by electric angle π are coupled to each other by the same-layer bridging portion (bridging conductor portion) 15. The phase terminal 16 forms an output lead wire as a phase output terminal in the present embodiment, and the phase terminal 17 is connected to a neutral point in the present embodiment. A pair of the phase terminals 16, 17 are arranged in the outermost layer while being separated from each other by a 6-slot pitch. A pair of black dots denote turning-back connecting portions 18 which will be described later.

The slot conductor portion 13 will now be described.

One phase winding shown in FIG. 2 includes the 64 (16 slots by 4 layers) slot conductor portions 13, and the 62 different-layer bridging portions 14. The slot conductor portions and the different-layer bridging portions are alternately connected in series. The phase winding includes two continuous lines which form a part of the winding band and the single bridging conductor portions 15 which communicate end portions on the inner side in the radial direction of the two continuous lines to form a part of the same-layer bridging portion.

The phase winding will now be described in more detail. The phase winding is configured by a first continuous line portion, a second continuous line portion and the bridging conductor portion 15. The first continuous line portion is formed by connecting from a first slot conductor portion 13-1 to a 32nd slot conductor portion 13-32 via the bridging portions 14 each of which forms the different-layer bridging portion. The second continuous line portion is formed by connecting from a 33rd slot conductor portion 13-33 to a 64th slot conductor portion 13-64 via the bridging portions 14 each of which forms the different-layer bridging portion. The bridging conductor portion 15 forms the same-layer bridging portion 15.

As shown in FIG. 2, the slot conductor portion 13 of the first continuous line portion and the slot conductor portion 13 of the second continuous line portion are respectively arranged in layers which are adjacent to each other in the radial direction (conductor housing positions) within the same slot 91. The conductor housing positions of the same layer in each slot 91 are alternately occupied by the slot conductor portion 13 of the first continuous line portion and the slot conductor portion 13 of the second continuous line portion.

The many bridging portions (different-layer bridging portions) 14 which extend from the end face on the pulley side of the stator core 9 form the first coil end 11. The many bridging portions (different-layer bridging portions) 14 which extend from the end face on the opposite-to-pulley side of the stator core 9 form the second coil end 12. In FIG. 2, the solid lines indicate the bridging portions (different-layer bridging portions) 14 and the bridging conductor portions (same-layer bridging portions) 15 on the phase terminal side (on the side to the second coil end 12), and the dotted lines indicate the bridging portions (different-layer bridging portions) 14 on the opposite-to-phase terminal side (on the side to the first coil end 11).

Each bridging portion (different-layer bridging portion) 14 has an approaching oblique portion, a return oblique portion and a turn portion. The approaching oblique portion advances in one of the circumferential directions by a 3-slot pitch, while advancing outwards in the axial direction from the end portion of one of the slot conductor portions 13, in other words, an opening end of one of the slots 91, while being inclined by a predetermined angle with respect to the axial direction and the circumferential direction. The return oblique portion advances in one of the circumferential directions by a 3-slot pitch, while advancing inwards in the axial direction while being inclined by a predetermined angle with respect to the axial direction and the circumferential direction, thereby reaching the end portion of another slot conductor portion 13, in other words, an opening end of another slot 91. The turn portion communicates between the approaching oblique portion and the return oblique portion.

The approaching oblique portion and the return oblique portion of the bridging portion (the different-layer bridging portion) 14 are separated from each other in the radial direction by an amount equivalent to a single layer. The turn portion is formed by turning back the continuous line so as to invert the traveling direction of the conductor in the axial direction and displace the conductor in the radial direction by an amount equivalent to a single layer.

Spatial interference should be avoided between the return oblique portion of one of the bridging portions (different-layer bridging portions) 14 which is provided while being inclined toward one of the circumferential directions and the approaching oblique portion of another bridging portion (different-layer bridging portion) 14 which is provided adjacent to one side of the circumferential directions and inclined toward one of the circumferential directions. To accomplish this, the return oblique portion of the one bridging conductor portion 14 is arranged at a position which is separated in the radial direction by an amount equivalent to a single layer from the approaching oblique portion of the above-described other bridging conductor portion 14, and crosses the approaching oblique portions of the other the bridging portions 14 viewed in the radial direction.

The bridging conductor portion 14 on the pulley side indicated by the dotted line has a 3-4th layer bridging portion 14-1 and a 1-2nd layer bridging portion 14-2. The 3-4th layer bridging portion 14-1 connects the fourth layer and the third layer, and the 1-2nd layer bridging portion 14-2 connects the second layer and the first layer, when counted from the phase terminal 16 side. The opposite-to-pulley side bridging conductor portion 14 indicated by the solid line has the 3-4th layer bridging portion 14-1, the 1-2nd layer bridging portion 14-2, and a 2-3rd layer bridging portion 14-3. The 3-4th layer bridging portion 14-1 connects the third layer and the fourth layer, the 1-2nd layer bridging portion 14-2 connects the first layer and the second layer, and the 2-3rd layer bridging portion 14-3 connects the third layer and the second layer, when counted from the phase terminal 16 side. The 2-3rd layer bridging portion 14-3 is adjacent to the outer side in the radial direction of a pair of protruded conductor portions 19 which form the same-layer bridging portion to be described later, and connects the second layer and the third layer.

The first coil end 11 and the second coil end 12 are formed along the end face of the stator core 9 by these bridging portions 14, and are formed into a cylindrical shape by the belt-shaped winding bands. Note that the layer numbers described herein are indicated in a sequence starting from the inner side to the outer side in the radial direction. Although one phase winding is illustrated in FIG. 2, the remaining five phase windings are formed into the same shape except that they are displaced by the amount equivalent to a 1-slot pitch.

The bridging conductor portion (the same-layer bridging portion) 15 connects by welding the opposite-to-pulley-side end portion of the 32nd slot conductor portion 13-32 which forms the end portion of the first continuous line when counted from one side of the circumferential directions of the winding band and the opposite-to-pulley-side end portion of the 33rd slot conductor portion 13-33 which forms the end portion of the seventh continuous line when counted from one side of the circumferential directions of the winding band. As shown in FIG. 1, the 32nd slot conductor portion 13-32 and the continuous line forming the 32nd slot conductor portion 13-32 have the protruded conductor portion 19 which is protruded long in the axial direction from the slot 91 to the opposite-to-pulley-side and which reaches the outer side in the axial direction of the bridging conductor portion 14. Therefore, both ends of the bridging conductor portion (same-layer bridging portion) 15 are respectively welded to the distal ends of the pair of the protruded conductor portions 19 to form the turning-back connecting portions 18.

The protruded conductor portion 19 will be described with reference to FIG. 3 and FIG. 4.

Figure 3:
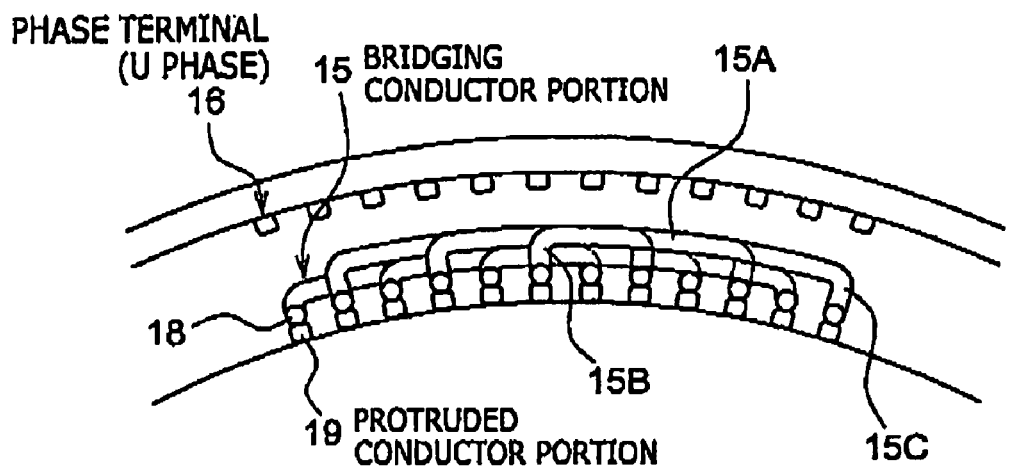
FIG. 3 is a partially expanded side view showing a same-layer bridging portion in FIG. 2.
Figure 4:
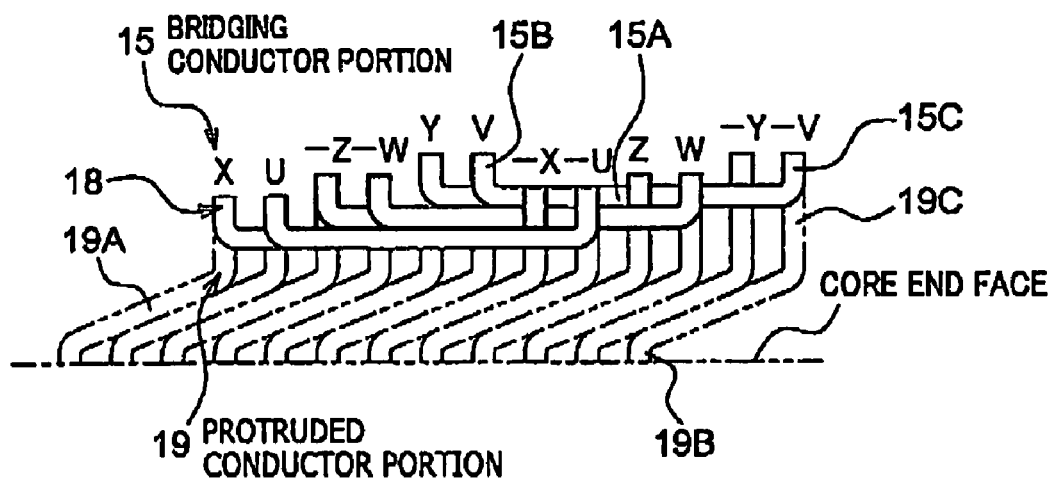
FIG. 4 is a partially expanded development view showing the same-layer bridging portion in FIG. 3.

FIG. 3 is a partially expanded side view in which the vicinity of the same-layer bridging portions 15 has been expanded, and FIG. 4 is a plan development view of FIG. 3 when viewed from the outer side to the inner side in the axial direction. However, in FIG. 4, the protruded conductor portions 19 are virtually displayed by two-dot chain lines, otherwise the protruded conductor portions 19 would interfere with the view of the bridging conductor portions 15. FIG. 3 and FIG. 4 show a total of 12 protruded conductor portions 19 for a total of 12 conductor wires and a total of six bridging conductor portions (same-layer bridging portions) 15. The 12 protruded conductor portions 19 are arranged adjacent to each other by the distance equivalent to a one-slot pitch (n+6 pitch).

In the present embodiment, the 32nd slot conductor portion 13-32 which forms the end portion of the first continuous line and the 33rd slot conductor portion 13-33 which forms the end portion of the second continuous line portion are arranged in the innermost layer of the four layers. The first slot conductor portion 13-1 which forms the end portion of the first continuous line and the 64th slot conductor portion 13-64 which forms the end portion of the second continuous line portion are arranged in the outermost layer of the four layers. In other words, the protruded conductor portions 19 are arranged in the innermost layer, and the phase terminals 16, 17 are arranged in the outermost layer. The protruded conductor portions 19 and the phase terminals 16 are arranged at the same position in the circumferential direction.

The protruded conductor portion group including the total of 12 protruded conductor portions 19 has an oblique portion 19A, a base-end straight portion 19B and a distal-end straight portion 19C. The oblique portion 19A is provided inclined in the same direction as the approaching oblique portion (which may be alternatively considered as the return oblique portion) of the already-described bridging portions 14 which are adjacent thereto on both sides in the circumferential direction thereof. The base-end straight portion 19B and the distal-end straight portion 19C are positioned at both ends thereof, respectively, and extend in the axial direction. The insulating film at the distal-end portion of the distal-end straight portion 19C has been peeled, thereby configuring the turning-back connecting portion 18 which is to be welded to the end portions of the bridging conductor portion 15.

The bridging conductor portion 15 which forms the same-layer bridging portion will be described with reference to FIG. 3 and FIG. 4.

The bridging conductor portion 15 includes a U-shaped conductor including a circumferential extending portion 15A which extends in the circumferential direction, and axial extending portions 15B, 15C which extend from the both ends of the circumferential extending portion 15A respectively outwards in the axial direction (or may extend inwards in the axial direction). The insulating films of the axial extending portions 15B, 15C have been peeled, and the axial extending portions 15B, 15C are welded to the distal-end straight portions 19C of the protruded conductor portions 19 which are adjacent to each other in the radial direction.

As described above, the stator coil 10 has two sets of three-phase windings, and the individual phase windings of the two sets of the three-phase windings with phase difference of 30 degrees in electric angle are housed separately in the two slots which are adjacent to each other.

Hereinafter the two phase windings with a phase difference of 30 degrees in electric angle among the two sets of three-phase windings are referred to as a first coil and a second coil. As shown in FIG. 3, the circumferential extending portion 15A of the bridging conductor portion 15 which belongs to the first coil and the circumferential extending portion 15A of the bridging conductor portion 15 which belongs to the second coil are arranged adjacent to each other in the radial direction. More specifically, the circumferential extending portion 15A of the bridging conductor portion 15 which belongs to the second coil is arranged on the outer side in the radial direction than the circumferential extending portion 15A of the bridging conductor portion 15 which belongs to the first coil.

The circumferential extending portions 15A of the total of six bridging conductor portions 15 are arranged at different positions in the axial direction for each phase of each three-phase winding. More specifically, the circumferential extending portions 15A of the bridging conductor portion 15 which belongs to the phase winding in the U phase and the X phase are arranged in the innermost side in the axial direction, the circumferential extending portions 15A of the bridging conductor portion 15 which belongs to the phase winding in the W phase and the Y phase are arranged in the outermost side in the axial direction, and the circumferential extending portions 15A of the bridging conductor portion 15 which belongs to the phase winding of the V phase and the Z phase are arranged at an intermediate position in the axial direction, respectively.

Such an arrangement enables arranging the total of six bridging conductor portions 15 while suppressing spatial interference with one another. Note that since the circumferential extending portions 15A of the bridging conductor portions 15 have different positions in the axial direction for each of the above-described phases, the axial extending portions 15B, 15C of the bridging conductor portions 15 will also have different positions in the axial direction. Accordingly, the lengths of the distal-end straight portions 19C of the protruded conductor portions 19 are adjusted to the different positions.

(Modifications)

In the present embodiment, one end from the total of six phase windings are neutral point lead wires, and the other ends of all are output lead wires, so as to configure the two sets of the three-phase windings.

Instead, the adjacent phase windings may be connected in series outside to configure a single phase winding. In this case, one set of three-phase windings are formed.

First, six long individual insulation-coated rectangular wires are folded into two portions at the center thereof to form a long U-shaped segment. The long U-shaped segment includes a U-shaped head portion and a pair of leg portions which are separated from both ends of the U-shaped head portion by the distance equivalent to a 1-magnetic pole pitch and which extend parallel and linearly. Such an arrangement enables configuring the winding band in which a total of 12 leg portions configure the individual continuous lines as described above.

By turning back the pair of leg portions of the long U-shaped segment at a predetermined pitch, the slot conductor portions 13 are able to be formed and the different-layer bridging portions (bridging portions) 14 in which the bridging portions 14 and the slot conductor portions 13 are alternately formed and developed. The thus formed six partial phase windings are aligned to form the developed coils, and then the developed coils are rounded into a cylinder shape so as to be housed in individual slots of the stator core 9. Subsequently, the U-shaped head portion of the long U-shaped segment is cut off, and next the bridging conductor portions 15 are welded, whereby the stator coil 10 can be completed.

Note that, if the initially-mentioned long U-shaped segment is folded onto the U-shaped head portion into the same shape as the shape of the bridging conductor portion 15, the above-mentioned bridging conductor portion (the same-layer bridging portion) 15 which has been separated from the winding band can be integrated into the conductor wire.

The stator coil 10 according to the above-mentioned embodiment offers the advantageous effects as follows.

In the second coil end 12, the slot conductor portion 13 to be connected to the phase terminals 16, 17 and the slot conductor portion 13 to be connected to the bridging conductor portion 15 are arranged in the outermost layer, and the innermost layer, respectively. In addition, the bridging conductor portion 15 which forms the same-layer bridging portion is positioned at the outer side in the axial direction of the bridging conductor portion 14 and arranged in the intermediate layer. Therefore, the bridging conductor portion 15 does not spatially interfere with the lead wire (for connecting phase terminals, for connecting neutral points, and for connecting partial phase windings) which is extended from the phase terminal 16. Furthermore, the bridging conductor portion 15, which forms a part of the same-layer bridging portion, is arranged on the intermediate-layer side than the protruded conductor portion 19 which forms the remaining portion of the same-layer bridging portion, which prevents the coil end from bulging in the radial direction. Furthermore, turning back by use of the above-mentioned bridging conductor portion 15 also enables the length to be compressed in the axial direction of the same-layer bridging portion and enables avoiding any increase in the length in the axial direction of the electric rotating machine. Other advantageous effects are the same as described above.

The phase terminals 16, 17 may be arranged in the innermost layer, and the protruded conductor portions 19 may be arranged in the outermost layer. Although the number of layers within the slots 91, that is, the number of the conductor housing positions aligned in the radial direction is not limited to 4, it is preferable that the number be an even number.

In the above-mentioned embodiment, a single partial phase winding is formed by processing a single continuous line by bending it, as is the case with the foregoing Japanese Patent Publication (laid open) No. 2004-88993. In the present modification, however, two continuous lines which extend parallel while being separated from each other by the distance equivalent to 1-magnetic pole pitch are folded back simultaneously or separately, whereby the slot conductor portion 13 and the bridging portion (different-layer bridging portion) 14 of the partial phase winding are formed. Next, the resultant end portions of these continuous lines are connected to each other via the separate bridging conductor portion 15. Such an arrangement eliminates waste of materials processing and facilitates easy operation.

Second Embodiment

A second embodiment, which is modified from the above-described bridging conductor portion 15, will now be described with reference to FIG. 5. and FIG. 6.

Figure 5:
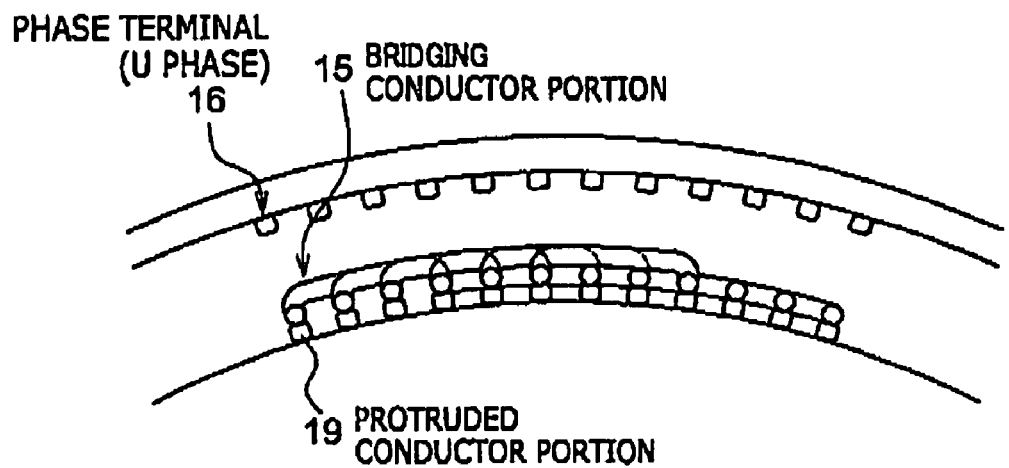
FIG. 5 is a partially expanded side view showing the same-layer bridging portion according to a second embodiment of the present invention.
Figure 6:
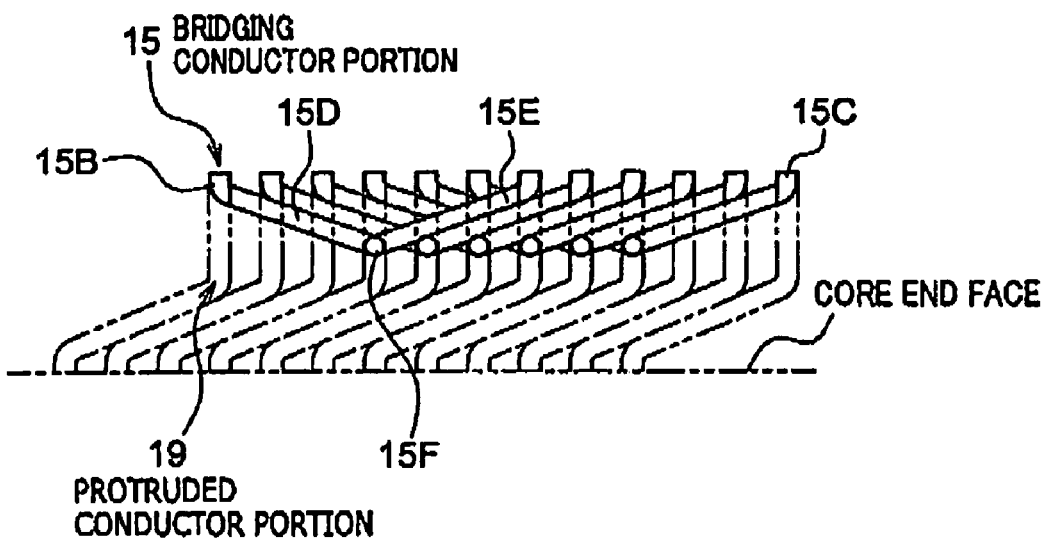
FIG. 6 is a partially expanded development view showing the same-layer bridging portion in FIG. 5.

FIG. 5 is a partially expanded side view in which the vicinity of the same-layer bridging portions 15 has been expanded, and FIG. 6 is a plan development view of the same-layer bridging portions in FIG. 5 is viewed from the inner side to outer side in the axial direction. In FIG. 6, however, the protruded conductor portions 19 are virtually displayed by two-dot chain lines, otherwise the protruded conductor portions 19 would interfere with the view of the bridging conductor portions 15. The bridging conductor portion 15 according to the present embodiment has a major characteristic in that, as is the case with the above-described bridging portion (different-layer bridging portion) 14, the circumferential extending portion 15A thereof as shown in FIG. 3 is formed into a ridge (C-letter) shape including an approaching oblique portion 15D and a return oblique portion 15E.

The approaching oblique portion 15D extends in one of the circumferential directions by the length equivalent to a 3-slot pitch, while advancing inwards in the axial direction from the axial extending portion 15B with being inclined by a predetermined angle with respect to the axial direction and the circumferential direction. The return oblique portion 15E extends in one of the circumferential directions by the length equivalent to a 3-slot pitch, while advancing outwards in the axial direction with being inclined by a predetermined angle with respect to the axial direction and the circumferential direction, and reaches the axial extending portion 15C.

As is the case with the bridging conductor portion 14, a turn portion 15F is formed between the approaching oblique portion 15D and the return oblique portion 15E. The turn portion 15F connects the approaching oblique portion 15D and the return oblique portion 15E which are separated from each other in the radial direction by the amount equivalent to the single layer. In other words, the turn portion 15F is formed by turning back the continuous line so as to invert the traveling direction of the conductor in the axial direction and to displace the continuous line in the radial direction by the amount equivalent to the single layer.

Spatial interference should be avoided between the return oblique portion 15E of one bridging portions which is provided with being inclined toward one of the circumferential directions and the approaching oblique portion 15D of another bridging portion which is provided while being adjacent to one side of the circumferential directions and inclined toward one of the circumferential directions. To accomplish this, the return oblique portion 15E of the one bridging portion 15 crosses the approaching oblique portions of the other bridging portions 15 viewed in the radial direction at a position which is separated in the radial direction by the amount equivalent to the single layer from the approaching oblique portion 15D of the other bridging portion 15.

As shown in FIG. 5 and FIG. 6, such an arrangement enables forming all bridging conductor portions 15 into the same shape and making the axial direction protrusion length of all protruded conductor portions 19 equal, which enables size reduction of the same-layer bridging portion, and facilitating easy operation. In addition, since the axial extending portions 15B, 15C of the bridging conductor portion 15 only requires the length which is necessary for welding, the length thereof can be made shorter.

Third Embodiment

A third embodiment, which is another modification of the above-described bridging conductor portion 15, will be described with reference to FIG. 7 and FIG. 8.

Figure 7:
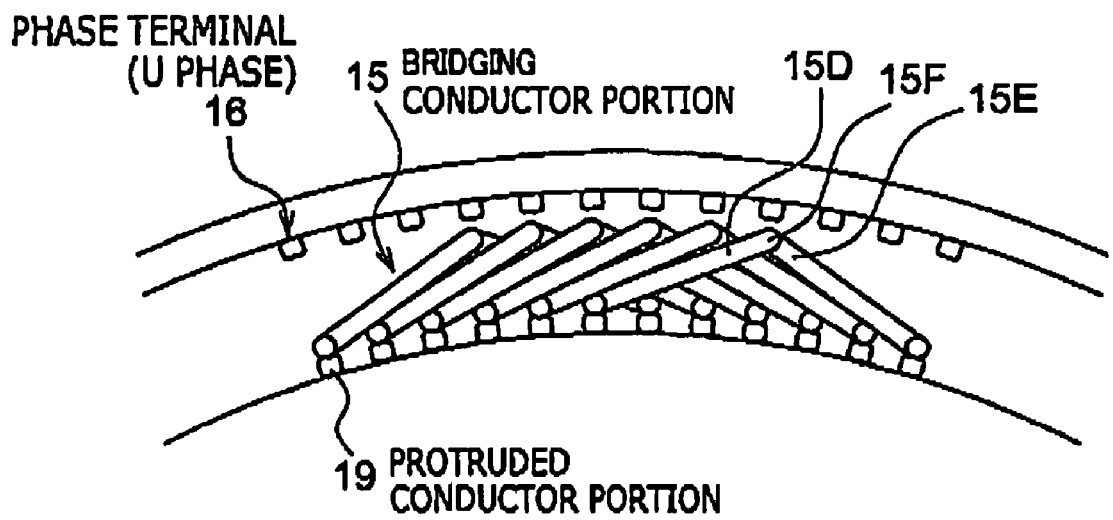
FIG. 7 is a partially expanded side view showing the same-layer bridging portion according to a third embodiment of the present embodiment.
Figure 8:
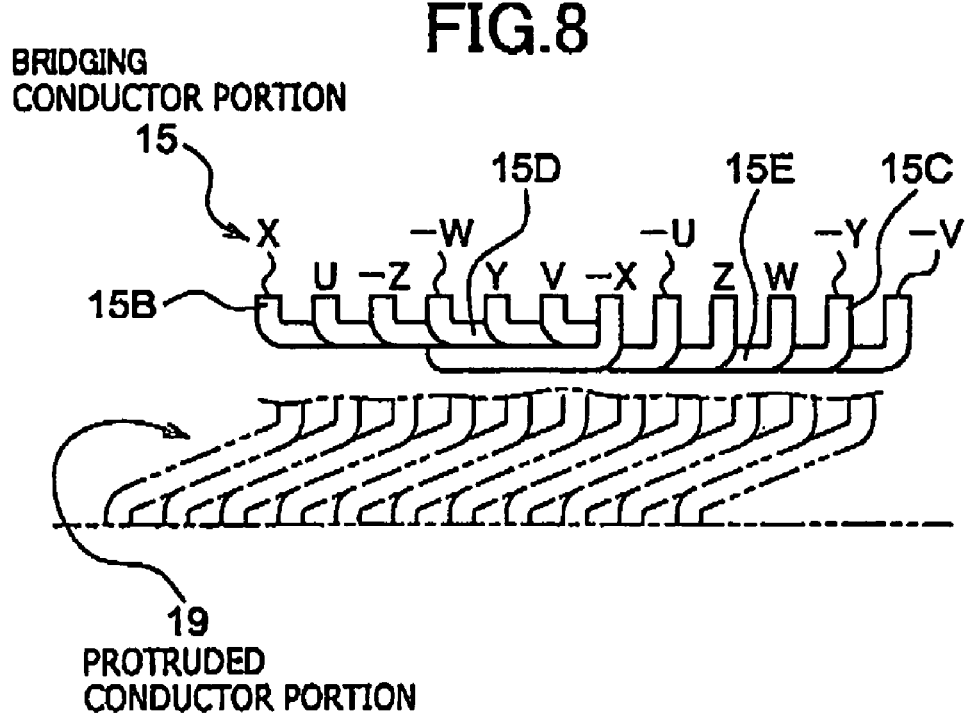
FIG. 8 is a partially expanded development view showing the same-layer bridging portion in FIG. 7.

FIG. 7 is a partially expanded side view in which the portion of the same-layer bridging portion has been expanded, and FIG. 8 is a plan development view of the same-layer bridging portion in FIG. 7 when viewed from the inner side to the outer side in the axial direction. In FIG. 8, however, illustration of the distal-end portion of the protruded conductor portion 19 has been omitted, since the protruded conductor portion 19 would otherwise interfere with the view of the bridging conductor portion 15.

In the present modification, the direction in which the bridging conductor portion 15 extends shown in FIG. 5 and FIG. 6 has been changed from the axial direction to the radial direction. Because of this change, the present embodiment is characterized in that the protrusion amount in the axial direction of the bridging conductor portion 15 is suppressed and the length in the axial direction of the coil end is reduced.

Specific description will be given with reference to FIG. 7 and FIG. 8.

As is the case with the bridging conductor portion 15 shown in FIG. 5 and FIG. 6, the bridging conductor portion 15 has a ridge (C-letter) shape including the approaching oblique portion 15D and the return oblique portion 15E. In the present modification, however, the approaching oblique portion 15D of the bridging conductor portion 15 extends outwards in the radial direction while extending in one of the circumferential directions, and the return oblique portion 15E of the bridging conductor portion 15 extends inwards in the radial direction while extending in one of the circumferential directions.

In other words, the approaching oblique portion 15D extends in one of the circumferential directions by the length equivalent to a 3-slot pitch, while traveling outwards in the radial direction from the axial extending portion 15B while being inclined by a predetermined angle with respect to the radial direction and the circumferential direction. The return oblique portion 15E extends in one of the circumferential directions by the length equivalent to a 3-slot pitch, while advancing inwards in the radial direction with being inclined by a predetermined angle with respect to the radial direction and the circumferential direction, and has reached the axial extending portion 15C.

The return oblique portion 15E is arranged, being displaced from the approaching oblique portion 15D by an amount substantially equivalent to the width thereof in the axial direction. The turn portion 15F is formed between the approaching oblique portion 15D and the return oblique portion 15E. The turn portion 15F is bent inwards in the axial direction from the tail end of the approaching oblique portion 15D and communicates with the start end of the return oblique portion 15E, for the purpose of connecting the approaching oblique portion 15D and the return oblique portion 15E which are separated from each other in the axial direction by an amount substantially equivalent to the width in the axial direction. Such an arrangement enables avoiding spatial interference between the approaching oblique portion 15D and the return oblique portion 15E.

The bridging conductor portion 15 of the present modification is substantially the same as the bridging conductor portion 15 shown in FIG. 5 and FIG. 6 except that the bridging conductor portion 15 of the present modification has a shape in which the bridging conductor portion 15 shown in FIG. 5 and FIG. 6 stands vertically outwards in the radial direction. Such an arrangement enables not only forming all bridging conductor portions 15 into the same shape, as is the case with the modification shown in FIG. 5 and FIG. 6, but also enables making the length in the axial direction of the coil end shorter.

Fourth Embodiment

Figure 9:
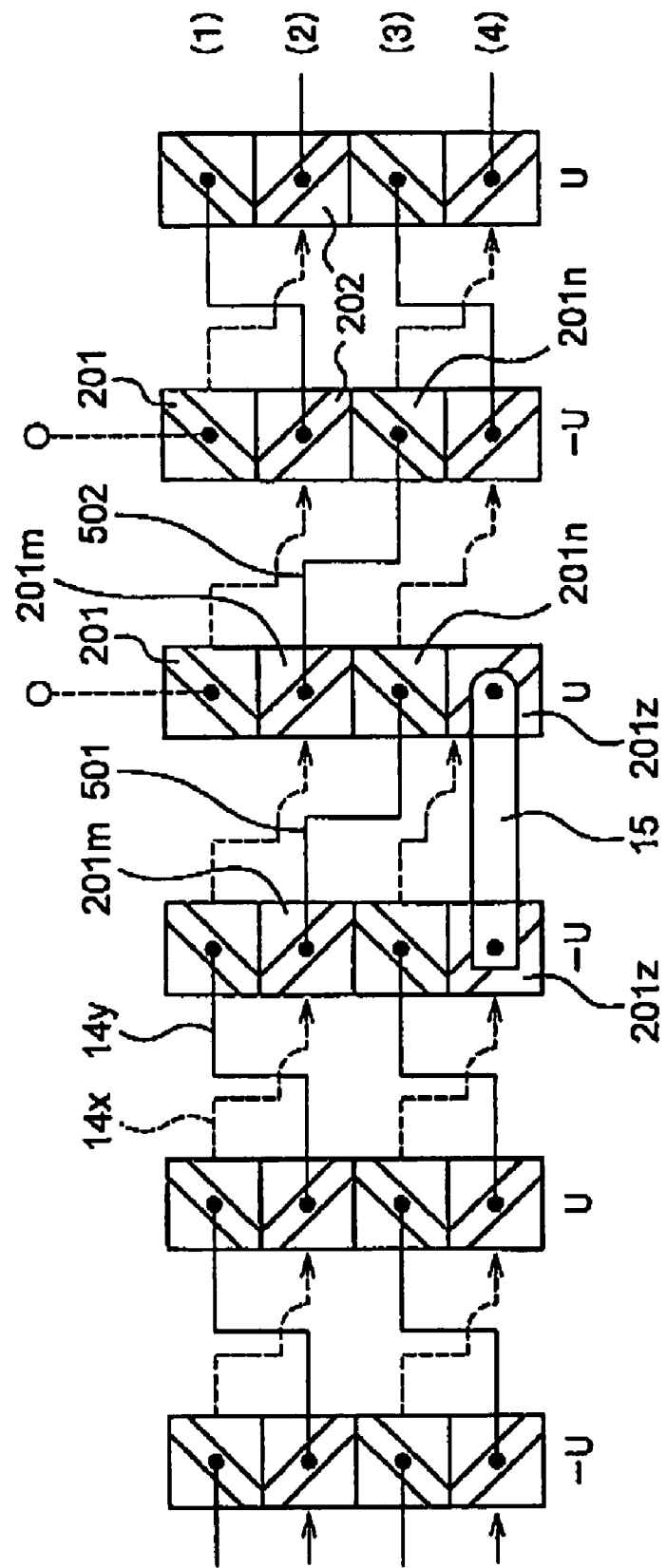
FIG. 9 is a partial development winding diagram according to a fourth embodiment of the present invention.

One example of the method of winding the winding band around the stator core 9 will be described with reference to FIG. 9. FIG. 9 is a partially expanded view of a three-phase stator coil with one slot in each pole and phase which is wound around the slot having four layers. Therefore, the winding band has a configuration in which six conductor wires are aligned. To facilitate understanding, however, FIG. 9 only shows the conductor wires in the U phase and the conductor wires in the −U phase.

In FIG. 9, the diagonal lines show individual layers in the slot, and each layer houses the slot conductor portion of a single conductor wire of the winding band. Numeral (1) denotes the outermost layer of the four layers of the slot, Numeral (2) denotes the subsequent outer layer, Numeral (3) denotes the subsequent inner layer, and Numeral (4) denotes the subsequent innermost layer. Alternatively, Numeral (1) may be the inner most layer of the four layers of the slot, Numeral (2) may be the subsequent inner layer, Numeral (3) may be the subsequent outer layer, and Numeral (4) may be the subsequent outermost layer.

Numeral 201 denotes an initial slot conductor portion group of the winding band, Numeral 202 denotes a subsequent slot conductor portion group of the winding band, and Numeral 248 denotes a final slot conductor portion group of the first winding of the winding band. Numeral 301 denotes the initial slot conductor portion group of the second winding of the winding band, Numeral 302 denotes the next slot conductor portion group of the winding band, and Numeral 348 denotes the final slot conductor portion group of the first winding of the winding band. Each slot conductor portion group includes six slot conductor portions which are aligned in parallel within an angle range of a total of electric angle π. The dotted lines show different-layer bridging portions 14$x$ on the back side, and the solid lines show different-layer bridging portions 14$y$ on the front side. Numeral 15 denotes a same-layer bridging portion. FIG. 9, however, shows only the different-layer bridging portions and the same-layer bridging portions of the U phase to facilitate understanding.

The first winding of the winding band occupies the outermost layer (1) and the outer layer (2) of the slot, and the second winding of the winding band occupies the inner layer (3) and the innermost layer (4) of the slot.

The final slot conductor portion groups 201$z$ of the winding band are connected with each other for each phase via the same-layer bridging portion 15. The initial slot conductor portion groups of the winding band may be of course connected with each other for each phase via the same-layer bridging portion 15.

Three out of the six conductor wires which form the initial slot conductor portion group of the winding band form the lead wires which function as the phase output terminals. The remaining three conductor wires are connected to each other so as to configure a neutral point.

The present embodiment is characterized in that different-layer bridging portions 501, 502 on the front side which communicate the final slot conductor portion group 201$m$ of the first winding of the winding band and the initial slot conductor portion group 201$n$ of the second winding of the winding band have different shapes from the shapes of other different-layer bridging portions on the front side. Specifically, as shown in FIG. 9, the different-layer bridging portions (illustrated by solid lines) 501, 502 are formed so that the right sides are lower than the left sides, and other different-layer bridging portions (illustrated by solid lines) on the front side are formed so that the right sides thereof are higher than the left sides.

Such an arrangement enables aligning two windings of the winding bands in each layer of the slot without a gap. In addition, such an arrangement enables advancing the winding band rightwards in all windings, which makes forming the winding band easier.

In the above-mentioned embodiment, the winding band is wound from the outermost layer. Alternatively, the winding band may be wound from the innermost layer, that is, a slot conductor portion group 348 to the slot conductor portion group 201.

Fifth Embodiment

Figure 10:
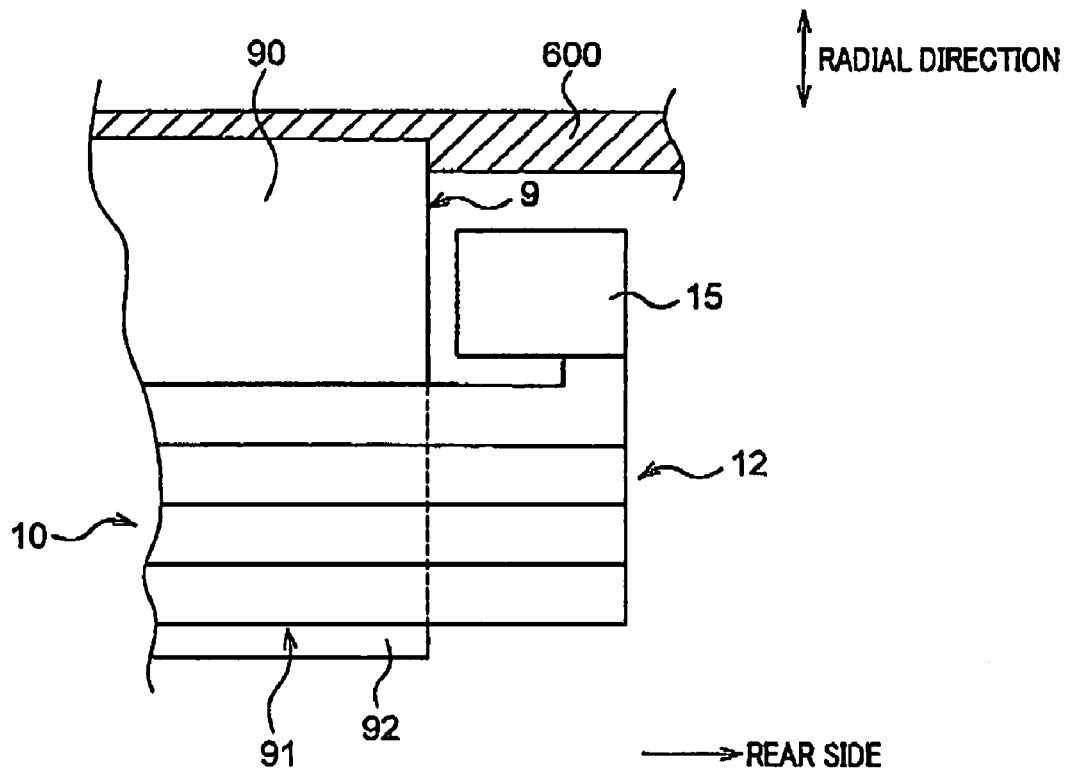
FIG. 10 is a partially axial and partially sectional view showing an electric rotating machine according to a fifth embodiment of the present invention.

A different arrangement pattern of the same-layer bridging portion 15 will be described with reference to FIG. 10. FIG. 10 is a partial sectional view in the partial axial direction showing a vicinity portion of the same-layer bridging portion 15 in the circumferential direction of the stator 8.

The stator core 9 has a back yoke 90, a slot 91 and teeth 92. The slot 91 houses the slot conductor portion of the stator coil 10. The coil end 12 which includes the different-layer bridging portion which is protruded from the slot conductor portion outwards in the axial direction is arranged in both sides in the axial direction of the stator core 9. Numeral 600 denotes a peripheral wall portion of a housing to which the stator core 9 is secured.

In the present embodiment, the same-layer bridging portion 15 is arranged adjacent to the outer side in the radial direction of the rear-side coil end 12. Numeral 18 denotes a turning-back connecting portion (welded portion). Such an arrangement enables omitting the protruded conductor portion 19 shown in FIG. 1, thereby enabling substantially shortening the length in the axial direction of the stator 8. The present embodiment is particularly preferable for an interior Permanent Magnet (IPM) motor which has a magnet motor with a small length in the axial direction, and an induction motor which has a basket-shaped rotor.

In the case where the length in the radial direction of the same-layer bridging portion 15 is larger than the width in the radial direction of the back yoke, only a portion which is adjacent to the same-layer bridging portion 15 of the peripheral wall portion 600 of the housing may be formed larger in diameter. In addition, an insulating sheet is provided between the same-layer bridging portion 15 and the inner peripheral surface of the above-mentioned large diameter portion of the peripheral wall portion 600 of the housing to cool down the stator coil 10. Next, both are brought into contact with each other so that the heat from the same-layer bridging portion 15 is transmitted to the peripheral wall portion 600 of the housing.

Sixth Embodiment

Figure 11:
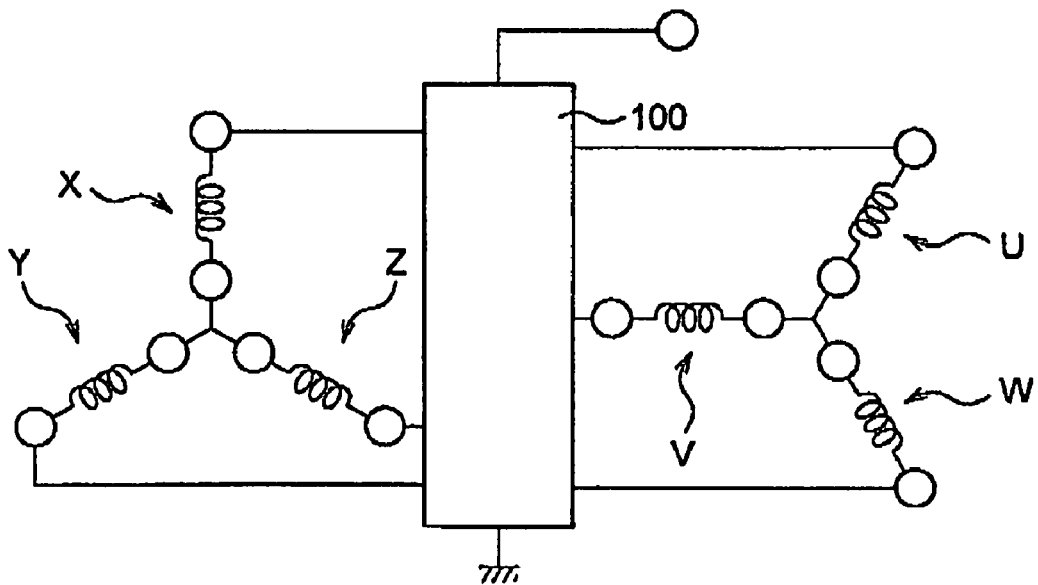
FIG. 11 is a circuit diagram showing an AC generator for a vehicle according to a sixth embodiment of the present invention.

Another embodiment will be described with reference to a circuit diagram shown in FIG. 11. In the present embodiment, the phase windings of the U, V and W phases form a first three-phase star-shaped winding, and the phase windings of the X, Y and Z phases form a second three-phase star-shaped winding. Both three-phase star-shaped windings are connected to a first three-phase full-wave rectifier (not shown) and to a second three-phase full-wave rectifier (not shown) in the rectifier 100 individually.

Seventh Embodiment

Figure 12:
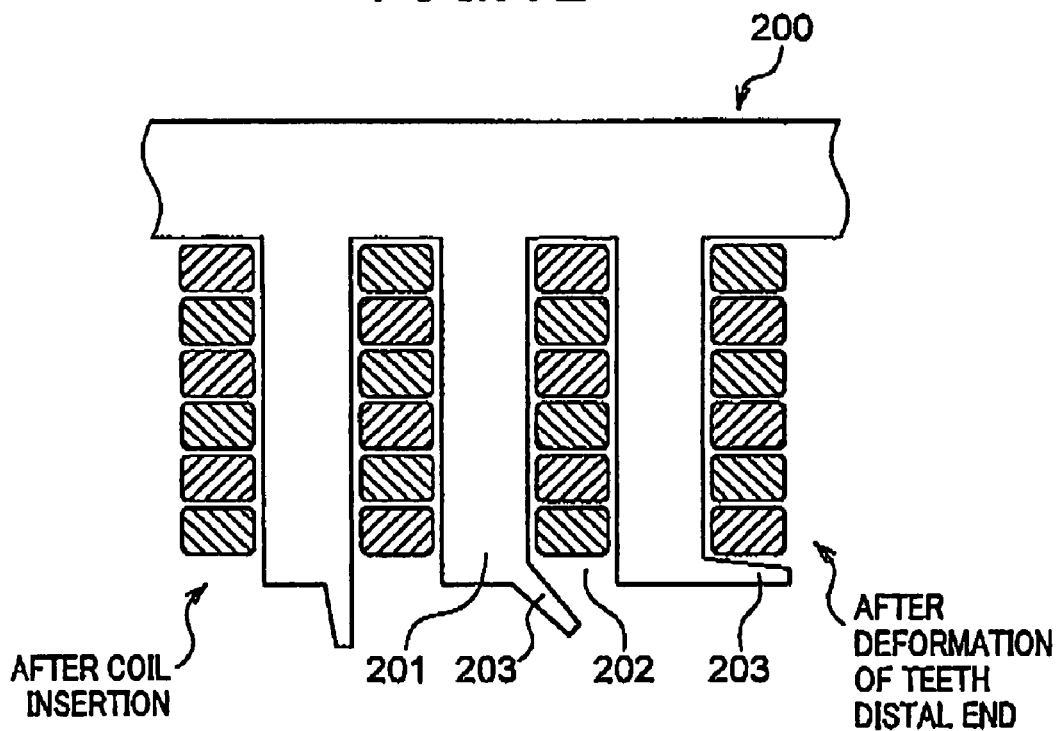
FIG. 12 is a partial schematic view showing an open-slot inner-rotor type electric rotating machine according to a seventh embodiment of the present invention.

A seventh embodiment will be described with reference to FIG. 12. Numeral 200 denotes an open slot-type stator core. A folded protruded piece portion 203 for throttling an opening 202 of the slot adjacent thereto is formed at the distal-end portion of the teeth 201 thereof.

Plastic deformation of the folded protruded piece portion 203 by approx. 90 degrees after insertion of the stator coil enables inhibiting coming off of the coil, without deteriorating insertability of a coil. The folded protruded piece portions 203 on both sides of the teeth 201 may be folded back in the opposite directions to throttle the opening 202 in a slot. However, in the case where the folded protruded piece portion 203 on only one side is folded back shown in FIG. 12, it is possible to extend the length of the folded protruded piece portion 203, thereby making plastic deformation processing easier.

Eighth Embodiment

Figure 13:
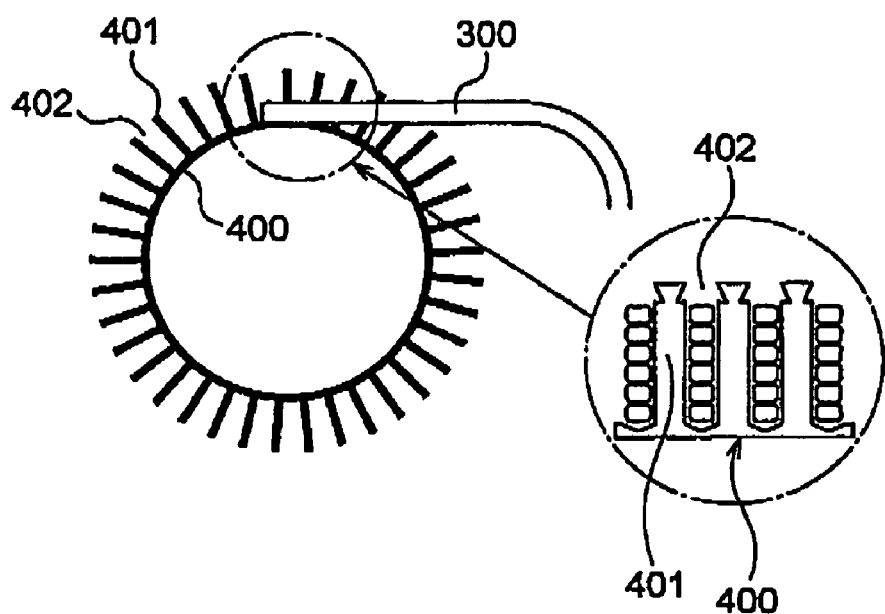
FIG. 13 is a schematic view showing an open-slot outer-rotor type electric rotating machine according to an eighth embodiment of the present invention.

An eighth embodiment will be described with reference to FIG. 13. In the present embodiment, a stator coil which is made up of the winding band and the same-layer bridging portion which have been described before is wound around a stator core of an outer rotor-type electric rotating machine. For the winding band 300, teeth 401 is formed radially on the outer periphery portion of a stator core 400, and the winding band 300 is wound around a slot 402.

Also in the present embodiment, it is preferable that the stator core 400 have an open slot structure and that the opening of the slot 402 is throttled by plastically deforming the distal-end portion of the teeth 401 after housing the winding band 300 in the slot 402.

The present embodiment enables inserting the winding band 300 from the outer side in the radial direction to the inner side in the radial direction, which eliminates the necessity of shrinking the coil to the toric shape and facilitates easy insertion of the coil.

(Modification)

On top of that, the winding operation can be simplified by separating the stator core into the teeth portion and the core back portion, housing the winding band between the teeth portions, and subsequently assembling the teeth portion to the core back portion. This assembled stator core is particularly suitable for an inner rotor-type electric rotating machine.

Ninth Embodiment

In the above descriptions, the winding band and the same-layer bridging portion 15 are formed separately, and they are welded to each other so as to form the stator coil. Alternatively, referring to FIG. 9, a winding band may be configured using three conductor wires each of which is formed of a long U-shaped conductor, and the head portion of each long U-shaped conductor may be processed into the same shape as the shape of the above-mentioned same-layer bridging portion 15. Accordingly, the winding band and the above-mentioned same-layer bridging portion 15 may be configured by the same conductor wire.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An AC electric rotating machine comprising:
a cylindrical stator core having plural slots; and
a multi-phase stator coil that is housed in the plural slots of the cylindrical stator core,
wherein the stator coil comprises:
a belt-shaped winding band, the winding band including a plurality of conductor wires that are sequentially housed in the slots that are separated from each other by electric angle substantially $\pi$ and which are aligned in parallel, and the winding band going around the stator core for two or more times while turning back in the axial direction at a pitch of electric angle substantially $\pi$, and
a same-layer bridging portion, the same-layer bridging portion including a plurality of bridging conductor portions which are provided on an outer side of one end face of the stator core for connecting end portions of the same phase which are separated from each other by an electric angle $\pi$ of end portions of each of the conductor wires, and the same-layer bridging portion being formed separately from the conductor wires of the winding band and joined to the end portion of the winding band or includes a part of the conductor wires of the winding band;
wherein the bridging conductor portion of the same-layer bridging portion connects the end portions of the same phase of each of the conductor wires which are protruded from the same layer of each of the slots; and
the conductor wire comprises:
plural slot conductor portions which are sequentially housed in two different layers of the slots of the same phase which are separated from each other by electric angle $\pi$, and
a different-layer bridging portion which communicates the end portions of a pair of the slot conductor portions which are housed in two different layers of the slots of the same phase which are separated from each other by electric angle $\pi$ on the outer side in the axial direction of the stator core to form a coil end portion;

wherein each of the bridging conductor portions of the same-layer bridging portion is arranged at a position overlapped in the axial direction with a protruded conductor portion formed of the end portion of the conductor wire protruded outwards in the axial direction, and extends at least in the circumferential direction; and wherein each of the bridging conductor portions has a substantially V-letter shape which includes a one half portion extending in one of the circumferential directions and inwards in the axial direction, and an other half portion extending in one of the circumferential directions and outwards in the axial direction from the end portion of the one half portion, and the one half portion and the other half portion of the bridging conductor portion extend separately from each other in the radial direction by an amount equal to thickness or more in the radial direction of the bridging conductor portion.

2. The AC electric rotating machine according to claim 1, wherein the one half portion of the each bridging conductor portion of mutually different phases are arranged at the same position in the radial direction except the end portions, the other half portion of the each bridging conductor portion of mutually different phases are arranged at the same position in the radial direction except the end portions, and the one half portion and the other half portion are arranged adjacent to each other in the radial direction.

3. The AC electric rotating machine according to claim 1, wherein the same-layer bridging portion is arranged at a position which is overlapped in the radial direction with the different-layer bridging portion which forms the coil end portion of the winding band.

4. An AC electric rotating machine comprising:
a cylindrical stator core having plural slots; and
a multi-phase stator coil that is housed in the plural slots of the cylindrical stator core,
wherein the stator coil comprises:
a belt-shaped winding band, the winding band including a plurality of conductor wires that are sequentially housed in the slots that are separated from each other by electric angle substantially π and which are aligned in parallel, and the winding band going around the stator core for two or more times while turning back in the axial direction at a pitch of electric angle substantially π, and
a same-layer bridging portion, the same-layer bridging portion including a plurality of bridging conductor portions which are provided on an outer side of one end face of the stator core for connecting end portions of the same phase which are separated from each other by an electric angle π of end portions of each of the each conductor wires, and the same-layer bridging portion being formed separately from the conductor wires of the winding band and joined to the end portion of the winding band or includes a part of the conductor wires of the winding band;
wherein the bridging conductor portion of the same-layer bridging portion connects the end portions of the same phase of each of the conductor wires which are protruded from the same layer of each of the slots; and
the conductor wire comprises:
plural slot conductor portions which are sequentially housed in two different layers of the slots of the same phase which are separated from each other by electric angle π, and
a different-layer bridging portion which communicates the end portions of a pair of the slot conductor portions which are housed in two different layers of the slots of the same phase which are separated from each other by electric angle π on the outer side in the axial direction of the stator core to form a coil end portion;

wherein each of the bridging conductor portions of the same-layer bridging portion is arranged at a position overlapped in the axial direction with a protruded conductor portion formed of the end portion of the conductor wire protruded outwards in the axial direction, and extends at least in the circumferential direction; and wherein each of the bridging conductor portions has a substantially V-letter shape which includes a one half portion extending in one of the circumferential directions and inwards in the radial direction, and an other half portion extending in one of the circumferential directions and outwards in the radial direction from the end portion of the one half portion, and the one half portion and the other half portion of the bridging conductor portion extend separately from each other in the axial direction by an amount equal to thickness or more in the axial direction of the bridging conductor portion.

5. The AC electric rotating machine according to claim 4, wherein the one half portion of the each bridging conductor portion of mutually different phases are arranged at the same position in the axial direction except the end portions, the other half portion of the each bridging conductor portion of mutually different phases are arranged at the same position in the axial direction except the end portions, and the one half portion and the other half portion are arranged adjacent to each other in the axial direction.

6. An AC electric rotating machine comprising:
a cylindrical stator core having plural slots; and
a multi-phase stator coil that is housed in the plural slots of the cylindrical stator core,
wherein the stator coil comprises:
a belt-shaped winding band, the winding band including a plurality of conductor wires that are sequentially housed in the slots that are separated from each other by electric angle substantially π and which are aligned in parallel, and the winding band going around the stator core for two or more times while turning back in the axial direction at a pitch of electric angle substantially π, and
a same-layer bridging portion, the same-layer bridging portion including a plurality of bridging conductor portions which are provided on an outer side of one end face of the stator core for connecting end portions of the same phase which are separated from each other by an electric angle π of end portions of each of the conductor wires, and the same-layer bridging portion being formed separately from the conductor wires of the winding band and joined to the end portion of the winding band or includes a part of the conductor wires of the winding band; and
wherein the bridging conductor portion of the same-layer bridging portion connects the end portions of the same phase of each of the conductor wires which are protruded from the same layer of each of the slots; and
the conductor wire comprises
plural slot conductor portions which are sequentially housed in two different layers of the slots of the same phase which are separated from each other by electric angle π, and
a different-layer bridging portion which communicates the end portions of a pair of the slot conductor portions which are housed in two different layers of the slots of the same phase which are separated from each other by electric angle π on the outer side in the axial direction of the stator core to form a coil end portion; and wherein the winding band has a peripheral end different-layer bridging portion which is a different-layer bridging portion for communicating the slot conductor portion forming a tail end of the Nth (wherein N is an integer 1 or more) orbit and the slot conductor portion forming a start end of the (N+1)-th orbit, and goes around two or more times, and the peripheral end different-layer bridging portion has a shape which is different from other of the different-layer bridging portions when viewed in the axial direction, and is arranged at a position where the other different-layer bridging portions are not arranged.

7. The AC electric rotating machine according to claim 6, wherein the other different-layer bridging portion on the N-th orbit communicates the slot conductor portion housed in the M-th layer on one end side in the circumferential direction and the slot conductor portion housed in the (M+1)-th layer on the other end side in the circumferential direction, the other different-layer bridging portion on the (N+1)-th orbit communicates the slot conductor portion housed in the (M+2)-th layer on one end side in the circumferential direction and the slot conductor portion housed in the (M+3)-th layer on the other end side in the circumferential direction, and the peripheral end different-layer bridging portion communicates the slot conductor portion housed in the (M+2)-th layer on one end side in the circumferential direction and the slot conductor portion housed in the (M+1)-th layer on the other end side in the circumferential direction.

8. The AC electric rotating machine according to claim 6, wherein the conductor wires and the bridging conductor portions are formed of rectangular wires.

9. The AC electric rotating machine according to claim 6, the AC electric rotating machine forming an AC generator for a vehicle.

10. An AC electric rotating machine comprising:
a cylindrical stator core having plural slots; and
a multi-phase stator coil that is housed in the plural slots of the cylindrical stator core,
wherein the stator coil comprises:
a belt-shaped winding band, the winding band including a plurality of conductor wires that are sequentially housed in the slots that are separated from each other by electric angle substantially $\pi$ and which are aligned in parallel, and the winding band going around the stator core for two or more times while turning back in the axial direction at a pitch of electric angle substantially $\pi$, and
a same-layer bridging portion, the same-layer bridging portion including a plurality of bridging conductor portions which are provided on an outer side of one end face of the stator core for connecting end portions of the same phase which are separted from each other by an electric angle $\pi$ of end portions of each of the conductor wires, and the same-layer briding portion being formed separately from the conductor wires of the winding band and joined to the end portion of the winding band or includes a part of the conductor wires of the winding band;
wherein the bridging conductor portion of the same-layer bridging portion connects the end portions of the same phase of each of the conductor wires which are protruded from the same layer of each of the slots; and
the conductor wire comprises
plural slot conductor portions which are sequentially housed in two different layers of the slots of the same phase which are separated from each other by electric angle $\pi$, and
a different-layer bridging portion which communicates the end portions of a pair of the slot conductor portions which are housed in two different layers of the slots of the same phase which are separated from each other by electric angle $\pi$ on the outer side in the axial direction of the stator core to form a coil end portion; and
wherein the bridging conductor portion of the same-layer bridging portion is formed separately from the conductor wire of the winding band and joined to the end portion of the winding band; and
wherein the winding band has a peripheral end different-layer bridging portion which is a different-layer bridging portion for communicating the slot conductor portion forming a tail end of the Nth (wherein N is an integer 1 or more) orbit and the slot conductor portion forming a start end of the (N+1)-th orbit, and goes around two or more times, and the peripheral end different-layer bridging portion has a shape which is different from other of the different-layer bridging portions when viewed in the axial direction, and is arranged at a position where the other different-layer bridging portions are not arranged.

11. An AC electric rotating machine comprising:
a cylindrical stator core having plural slots; and
a multi-phase stator coil that is housed in the plural slots of the cylindrical stator core,
wherein the stator coil comprises:
a belt-shaped winding band, the winding band including a plurality of conductor wires that are sequentially housed in the slots that are separated from each other by electric angle substantially $\pi$ and which are aligned in parallel, and the winding band going around the stator core for two or more times while turning back in the axial direction at a pitch of electric angle substantially $\pi$, and a same-layer bridging portion, the same-layer bridging portion including a plurality of bridging conductor portions which are provided on an outer side of one end face of the stator core for connecting end portions of the same phase which are separated from each other by an electric angle $\pi$ of end portions of each of the conductor wires, and the same-layer bridging portion being formed separately from the conductor wires of the winding band and joined to the end portion of the winding band or includes a part of the conductor wires of the winding band;
wherein the bridging conductor portion of the same-layer bridging portion connects the end portions of the same phase of each of the conductor wires which are protruded from the same layer of the each slot; and
the conductor wire comprises:
plural slot conductor portions which are sequentially housed in two different layers of the slots of the same phase which are separated from each other by electric angle $\pi$, and
a different-layer bridging portion which communicates the end portions of a pair of the slot conductor portions which are housed in two different layers of the slots of the same phase which are separated from each other by electric angle $\pi$ on the outer side in the axial direction of the stator core to form a coil end portion;
wherein the end portion of the winding band is formed by an end portion of the each conductor wire which is protruded from the each conductor wire housed either in an innermost layer which is on the innermost side in the radial direction or in an outermost layer which is on the outermost side in the radial direction of many layers of the slot; and wherein the winding band has a peripheral end different-layer bridging portion which is a different-layer bridging portion for communicating the slot conductor portion forming a tail end of the N-th (wherein N is an integer 1 or more) orbit and the slot conductor portion forming a start end of the (N+1)-th orbit, and goes around two or more times, and the peripheral end different-layer bridging portion has a shape which is different from other of the different-layer bridging portions when viewed in the axial direction, and is arranged at a position where the other different-layer bridging portions are not arranged.

* * * * *